United States Patent [19]

McNeel

[11] 4,285,054
[45] Aug. 18, 1981

[54] GEOPHONE

[75] Inventor: William O. McNeel, Houston, Tex.

[73] Assignee: Mark Products, Inc., Houston, Tex.

[21] Appl. No.: 61,279

[22] Filed: Jul. 27, 1979

[51] Int. Cl.³ .............................. G01V 1/16; F16L 1/34
[52] U.S. Cl. .................................... 367/183; 267/161;
367/187
[58] Field of Search ..................... 367/182, 183, 187;
29/594; 267/161–163

[56] References Cited

U.S. PATENT DOCUMENTS

| 3,251,028 | 5/1966 | Haggard | 267/161 |
| 3,577,184 | 5/1971 | McNeel et al. | 367/183 |
| 3,602,490 | 8/1971 | Mueller et al. | 367/183 |
| 3,718,900 | 2/1973 | Holmes | 267/161 |
| 3,738,445 | 6/1973 | Wilson et al. | 367/183 |
| 3,890,606 | 6/1975 | Florian et al. | 367/183 |
| 4,144,765 | 3/1979 | Ashe | 267/162 |

Primary Examiner—Nelson Moskowitz
Attorney, Agent, or Firm—Jennings B. Thompson; Marvin B. Eickenroht

[57] ABSTRACT

A geophone comprising an annular coil-mass and a permanent magnet assembly positioned inside the annular coil-mass with their longitudinal axes generally coinciding to place the coil-mass in the magnetic field of the permanent magnet assembly. Spring spiders support the coil-mass on the permanent magnet assembly for axial and rotational movement relative to the permanent magnet assembly along and around the longitudinal axis thereof. Contacts extend outside the housing of the geophone to connect the geophone into an electrical circuit. Two axially spaced, parallel, spring spiders or diaphragm springs electrically connect the outside contacts to the terminals of the coils of the coil-mass.

3 Claims, 6 Drawing Figures

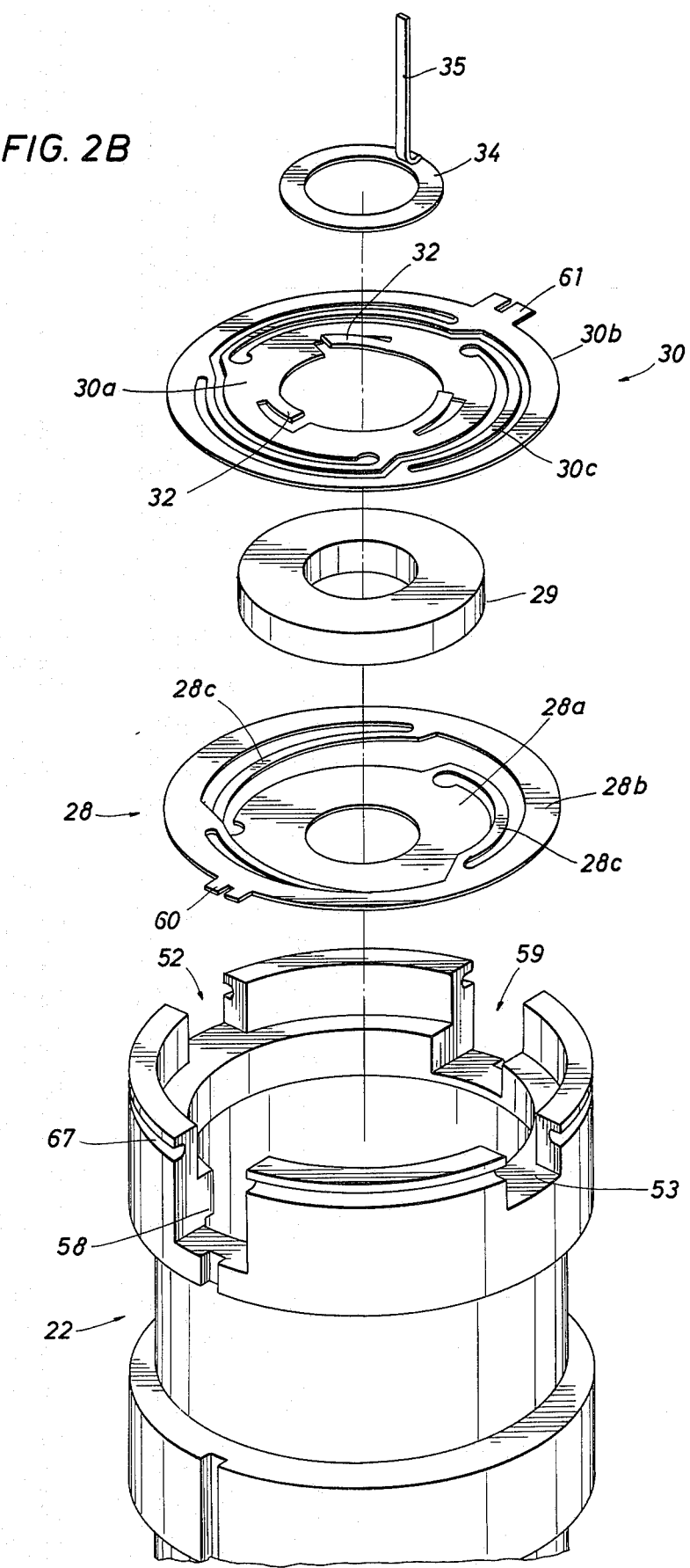

GEOPHONE

This invention relates to geophones generally, and in particular to geophones in which movement is measured by the current induced in a coil that moves in a magnetic field due to inertia.

In this type of geophone, the coil of wire is wrapped on a coil-form, which along with the wire itself provides a mass having sufficient inertia to cause relative movement between the coil-mass and the permanent magnet of the geophone, when the geophone is moved by seismic energy. One of the design problems in geophones of this type is the electrical connection between the coil and the outside contacts mounted in the housing of the geophone. For example, this must be done in such a way that the connection has at the most, a minimal effect, and preferably no effect, on the frequency of the geophone. In other words, the connection should offer no damping to the relative movement of the coil-mass and the magnet. It should also impose no eccentric loading on the coil-mass. Further, the coil wire is usually very thin and, therefore, the end terminals of the coils can be unsupported for only short distances because even the very small inertia of the wire of the terminals will cause relative movement between the terminals and the coil-form as the coil-form reciprocates. This working of the wire can result in an early failure of the wire.

Usually, in this type of geophone the permanent magnet is cylindrical in shape and is mounted in the housing for movement with the housing. The coil-mass is annular and surrounds or encircles the magnet with its longitudinal axis, along which it is mounted to move, coinciding with the longitudinal axis of the magnet. The electrical connection between the coil and the outer contacts of the geophone should not interfere with the ability of the coil-mass to rotate around its longitudinal axis relative to the permanent magnet. This is an important consideration because geophones are often subjected to abrupt twisting motions in the field that urge the coil-mass to rotate around its longitudinal axis relative to the permanet magnet assembly upon which it is mounted. If the coil-mass is not free to rotate, these torsional forces will be imposed on the diaphragm springs that support the coil-mass. These springs are not designed to withstand this type of force and can be easily damaged by it. Therefore, it is desirable that the coil-mass be free to rotate around its longitudinal axis relative to the permanent magnet assembly.

It is an object of this invention to provide a geophone of the type described above having an improved electrical connection between the output terminals of the coil of the geophone and the outside contacts of the geophone.

It is another object of this invention to provide a geophone housing an improved electrical connection between the terminals of the coil of the geophone and the outside contacts that allows the coil-mass to freely rotate relative to the permanent magnet assembly of the geophone, that has only one sliding contact in the circuit between the coil and the outside contacts, and which can be easily assembled thereby reducing the labor costs attributable to the manufacture of the geophone.

These and other objects, advantages and features of this invention will be apparent to those skilled in the art from a consideration of this specification, including the attached drawings and appended claims.

IN THE DRAWINGS

FIGS. 2A and 2B are exploded isometric views of the parts comprising the upper portion of the geophone of FIG. 1.

Figure 1:
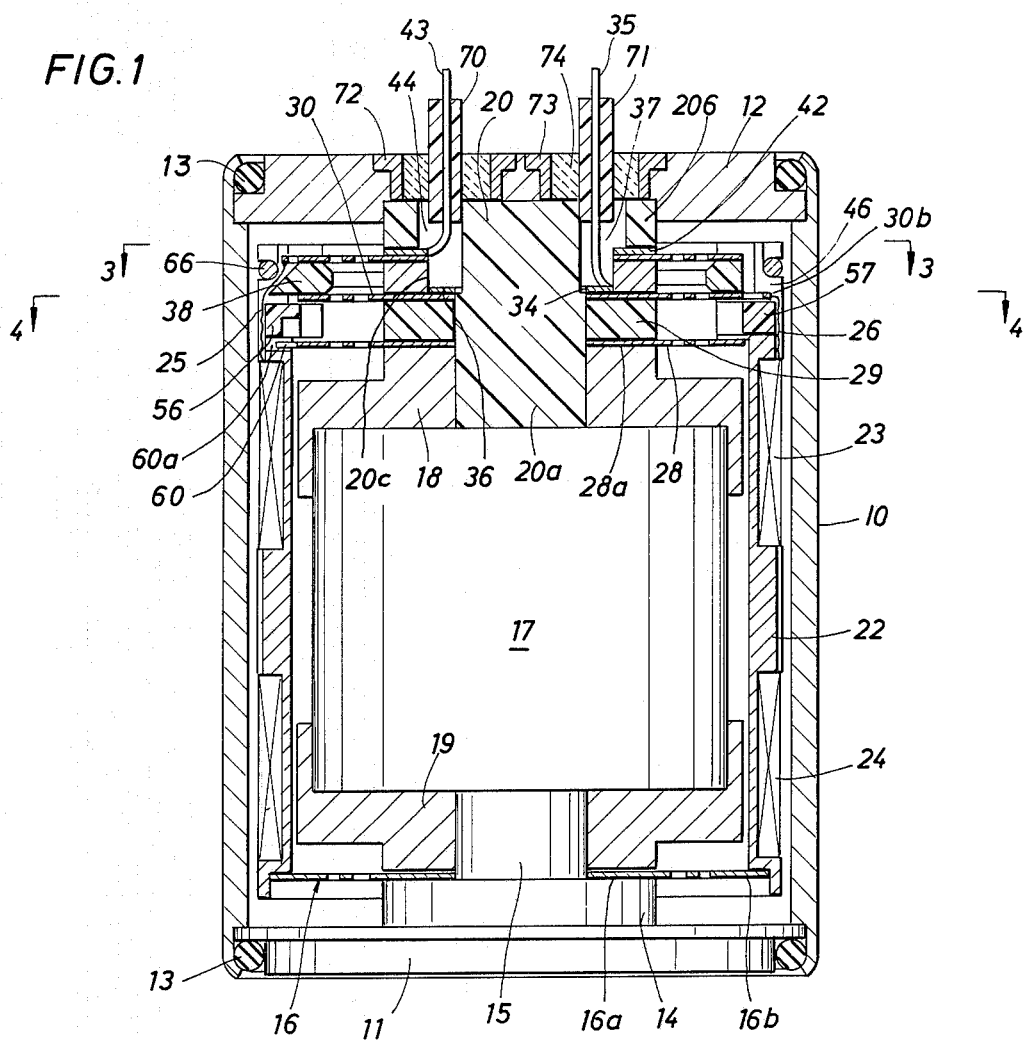
FIG. 1 is a sectional view of the preferred embodiment of the geophone of this invention.

The completely assembled geophone of FIG. 1 includes cylindrical housing 10, which is closed at the bottom end by bottom support member 11 and at the top end by header 12. In the final assembly, O-rings 13 are placed in position between the end closure members and the cylindrical housing and then the upper edges of the housing are bent over into firm engagement with the O-rings to seal the inside of housing.

Bottom support member 11 has cylindrical portions or bosses 14 and 15 of different diameters. Cylindrical portion 14 provides an upwardly facing circular surface to support inner annular portion 16a of bottom geophone spring 16. Cylindrical portion 15, which is of smaller diameter than portion 14, centers the bottom spring 16 and also supports cylindrical magnet 17. Pole pieces 18 and 19 of ferromagnetic material are positioned on opposite ends of the magnet and serve to help shape the magnetic field provided by permanent magnet 17. The magnetic attraction between magnet 17 and pole piece 19 supports the pole piece in spaced relationship to lower geophone spring 16. This allows the spring to freely rotate relative to cylindrical portion 15 of the bottom support.

Magnet 17 is held in position from the top of the geophone housing by centering and spacing member 20, which includes cylindrical shaft or post member 20a and intergrally attached flanges or hubs 20b and 20c of different diameters. Shaft member 20a extends between upper housing closure member or header 12 and the top of magnet 17 to combine with bottom support 15 to hold the magnet from movement axially of the housing. Flange 20b fits in a recess provided in header 12 to hold the flange and shaft member 20a from lateral movement. The shaft member extends through upper magnet pole cap 18 and combines with the pole cap to prevent lateral movement of the upper end of the magnet relative to the housing. In the same manner, cylindrical portion 15 of bottom support 11 through its engagement with lower magnet pole cap 19 holds the lower portion of the magnet against lateral movement.

The magnet, the pole pieces, and the supporting members form a permanent magnet assembly that is generally cylindrical in cross section. It is fixed in housing 10 with its longitudinal axis in general alignment with the longitudinal axis of the housing. Both the bottom support member 15 and upper member 20 are made of electrically non-conducting material.

Surrounding the cylindrical magnet assembly is annular coil-form 22, The coil-form is cylindrical in cross section and has axially spaced recesses in which wire is wound to form axially spaced coils 23 and 24 on the outer surface of the coil form. The two coils are connected together and have two output terminals, or leads, 25 and 26.

Top geophone spring 28 and bottom geophone spring 16 are basically of the same design, so only spring 28 is shown in a plan type view (FIG. 2B). It includes inner annular portion 28a, outer annular portion 28b, and three arcuate or involute spring arms or reeds 28c that connect the outer and inner annular portions. These springs are called diaphragm springs or spring spiders. Both the bottom and upper springs are preformed as shown in FIG. 2b prior to assembly so that the weight of coil-form 22 with the wire wrapped thereon will move the outer annular portions of the springs into substantial alignment with the planes of the inner annular portions, as shown in FIG. 1. It is these springs that determine the frequency of the geophone. Upper geophone spring 28 is located with its inner annular portion 28a engaging the upper annular flat surface provided by top pole piece 18. The outer annular portion of spring 28 engages the upper assembly of the coil-form yet to be described to receive the weight of the coil-mass (the coil-form and the wire wrapped thereon) that it supports. The lower geophone spring has its outer annular portion 16b in engagement with a downward facing shoulder at the bottom of the coil-form as shown in FIG. 1.

Figure 2A:
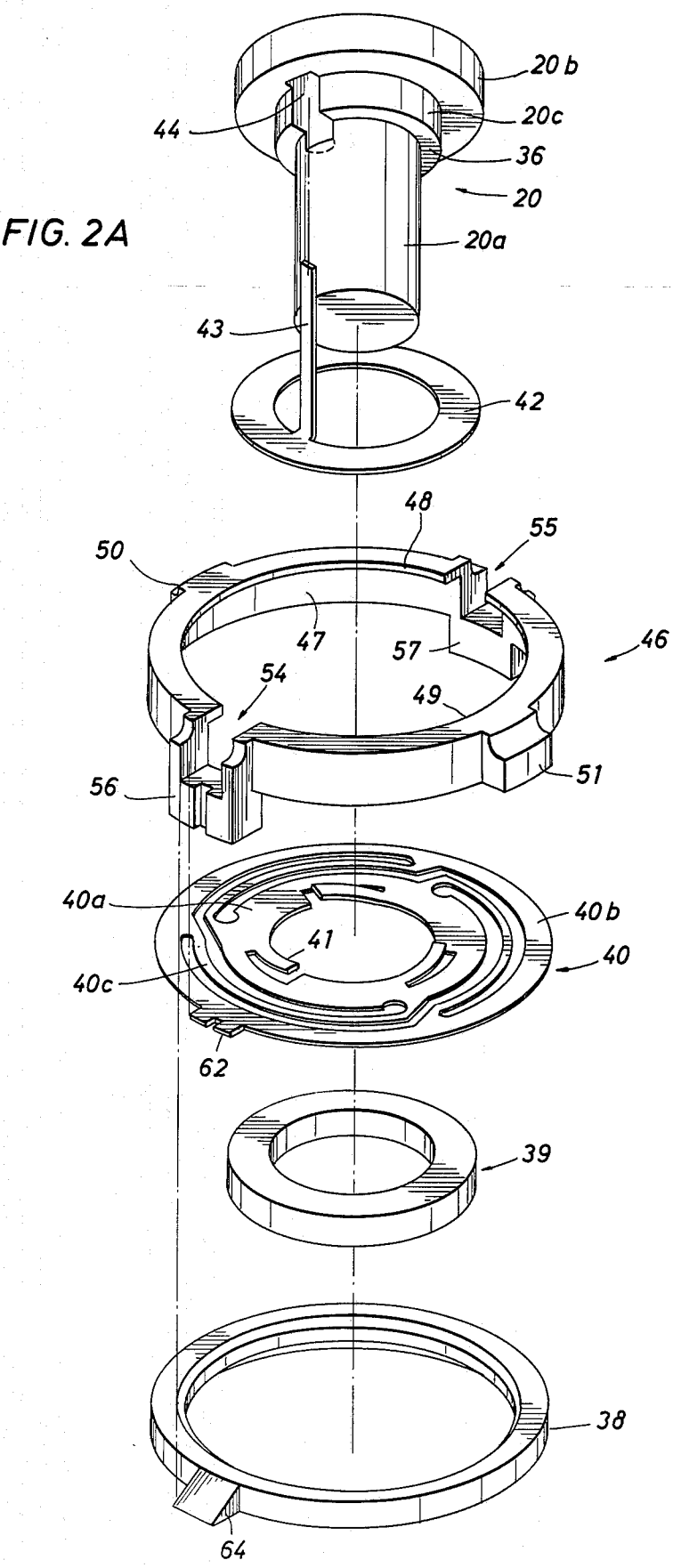

The remainder of the components of the geophone of this invention will be described generally in the order in which they are assembled with reference being made to both FIG. 1 and FIGS. 2A and 2B.

Inner bottom spring spacer 29 of electrically nonconductive material is positioned above upper geophone spring 28. This spacer is cylindrical in shape having an opening to receive centering post 20a and flat ends to engage the inner annular portion of spring 28. Lower spring contact 30 is positioned on top of spacer 29. This spring contact is of the diaphragm type spring design and preferably is of substantially the same design as the top and bottom geophone springs and made from a similar spring material. The material must be one that is a good electrical conductor such as berylliumcopper. To further improve the conductivity of the spring, it is preferably gold or silver plated. In the embodiment shown, lower spring contact 30 incldues inner annular portion 30a, outer annular portion 30b and three arcuate arms 30c that interconnect the two annular portions. The inner annular portion has L-shaped cuts extending from the central opening to provide tabs 32 that are bent upwardly out of the plane of the contact, in the manner shown in FIG. 2b prior to assembly. The tabs are forced downwardly by contact ring 34 in the final assembly of the geophone so that each tab will exert a resilient force on contact ring 34 to maintain good electrical contact with the contact ring. The resilient force of the tabs is not such that it will prevent contact spring 30 from freely rotating relative to the contact ring, should the coil-mass rotate relative to the permanent magnet assembly for the reasons discussed above.

Outside geophone contact 35 is attached to contact ring 34 and extends upwardly therefrom. The contact extends through header 12 to provide an outside contact for connecting the geophone into an electrical circuit. Lower contact spring 34 is held in position to be engaged by tabs 32 by downwardly facing shoulder 36 of hub 20c on centering shaft 20a. Opening 37 extends through hub 20c and flange 20b to accommodate contact 35.

Terminal spacer 38, which is made of electrically nonconductive material, is positioned above outer annular portion 30b of spring contact 30. Then inner upper spring contact spacer 39, also of insulating material, is positioned to support upper spring contact 40 a selected distance above lower spring contact 30. Upper spring contact 40 is made of the same electrically conductive spring material and has the same configuration as the lower spring contact including having tabs 41 that are preformed out of the plane of the spring contact to resiliently engage contact ring 42 to maintain good electrical contact with the contact ring. Outside contact 43 is connected to contact ring 42. When assembled, outside contact 43 extends upwardly through opening 44 in hub 20c on centering shaft 20a. The lower surface of flange 20b holds contact ring 42 in firm engagement with tabs 41.

The last member to be positioned in the upper assembly of the geophone is terminal insulator 46. This member is made of electrically non-conductive material and includes cylindrical portion 47 to which is attached inwardly extending semicircular flanges 48 and 49. The inside diameter of these flanges is such that they will engage the outer annular portion 40b of spring contact 40. Cylindrical portion 47 of the terminal insulator has protruding lugs 50 and 51 positioned on opposite sides of the cylindrical portion to engage grooves or slots 52 and 53 on the upper end of coil-form 22. Cylindrical portion 47 also has transverse slots 54 and 55 located 180° apart. These slots substantially divide cylindrical portion 47 into two portions which are connected by U-shaped members 56 and 57. These members engage slots 58 and 59 on the upper end of coil-form 22. The slots in coil-form 22 are best seen in FIG. 2B.

Terminal spacer 46 serves not only to space the spring contacts apart, but also to hold the upper geophone spring and the contact springs from rotation relative to the coil-form. Positioning lug 60 extends outwardly from the periphery of top spring 28. This lug engages groove 60a on the bottom of U-shaped lug 56 which holds the spring from rotation relative to the terminal spacer and the coil-form. Lower contact spring 30 has similar lug 61 on its outer periphery, which engages groove 55 in the terminal spacer. Upper contact spring 40 has locating lug 62, which engages groove 54 in the terminal spacer as shown in FIGS. 3 and 5.

Figure 3:
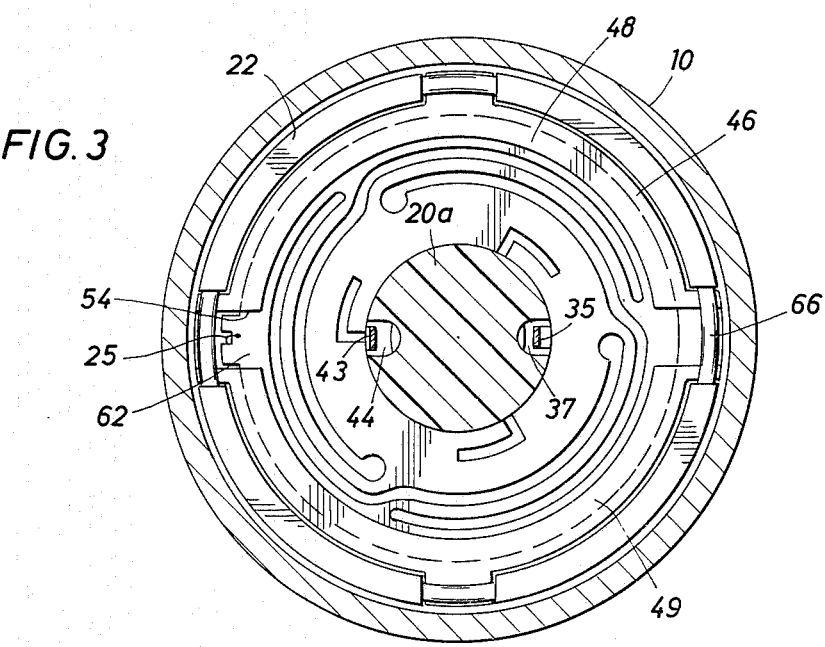
FIG. 3 is a sectional view taken along line 3—3 of FIG. 1.
Figure 4:
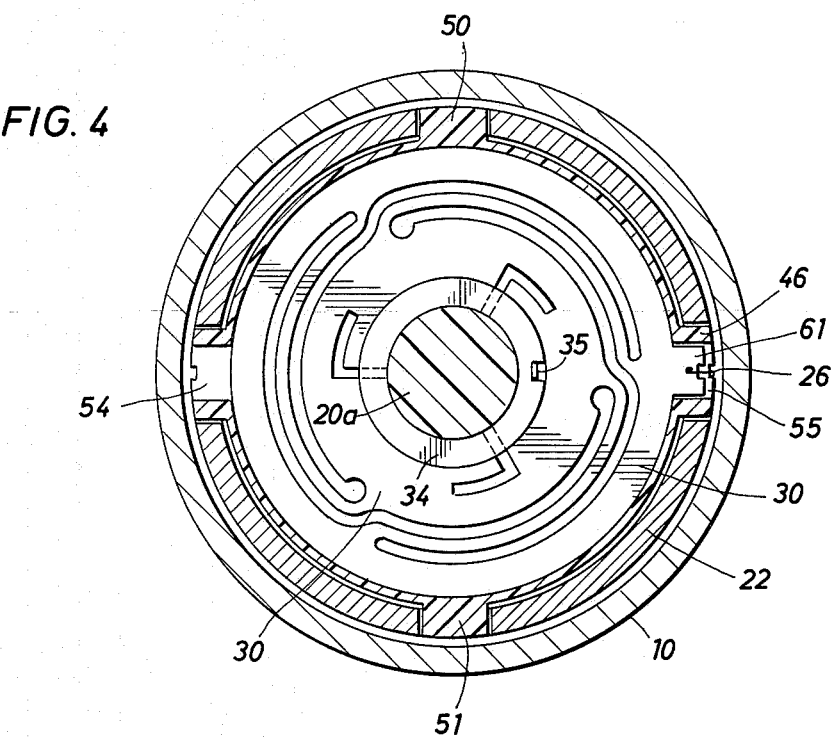
FIG. 4 is a sectional view taken along line 4—4 of FIG. 1.
Figure 5:
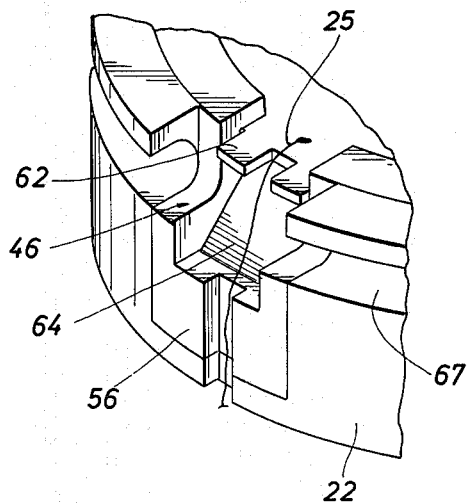
FIGS. 5 and 6 are isometric views on an enlarged scale showing the connections of the terminal wires of the coils to the contact springs employed in this invention to electrically connect the coil to the outside contacts of the geophone.
Figure 6:
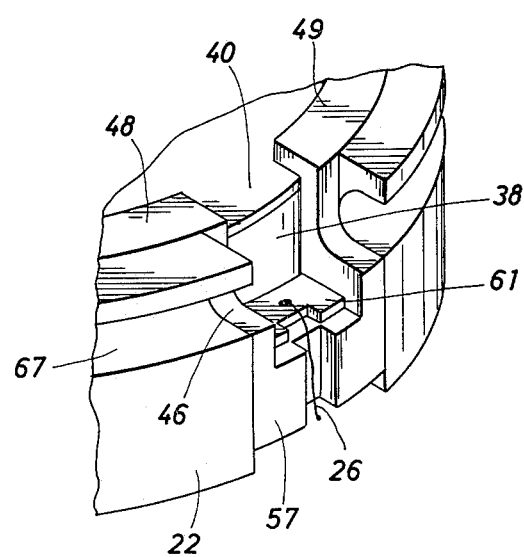

FIGS. 3, 4, 5, and 6 show the electrical connection between terminal wires 25 and 26 of the coil and the two spring contacts. In FIGS. 3 and 5 terminal 25 is soldered to positioning tab 62 of the spring contact. Appropriate grooves are provided in the members to receive the terminal wire. In FIGS. 4 and 6 terminal wire 26 is connected to positioning tab 61 of the lower spring contact and the appropriate grooves are also provided, as shown.

To provide further protection to terminal wire 25, triangular-shaped lug 64 is attached to the outer periphery of terminal spacer 38. The inclined surface of the lug supports terminal wire 25 between the lower end of the groove 54 and lug 64. Snap ring 66 placed in snap ring groove 67 locks the entire assembly together in the upper end of the coil-form.

Thus electrical connections between the terminals of the coil on coil-form 22 and outside contacts 35 and 43 are provided that allow the coil-mass to freely rotate relative to the permanent magnet assembly of the geophone. By using spring spiders or diaphragm springs to act as conductors between the terminals and a slip ring contact, no eccentric loading is imposed on the coil-mass as it moves axially relative to the permanent magnet assembly. Preferably, the contact springs have little or no effect upon the frequency of the geophone. As stated above, this is primarily determined by the top and bottom geophone springs.

Outside contacts 35 and 43 are hermetically sealed to upper housing closure 12 by soldering in the conventional manner, i.e., they are sheathed in tubes 70 and 71, which are potted in ferrules 72 and 73 by glass 74.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A geophone comprising a magnet assembly and an annular coil-mass, spring means supporting the coil-mass for rotation and axial movement relative to the magnet assembly around and along a preselected axis, said spring means including a pair of disc-shaped springs having outer and inner annular portions connected by a plurality of arcuate spring arms, said springs being preformed to position the outer annular portion of each spring in a plane spaced above the plane of the inner annular portion a distance such that the weight of the coil-mass will move the outer annular portion downwardly into substantial alignment with the plane of the inner annular portion to thereby resiliently support the coil-mass, a pair of outside contacts and means electrically connecting the outside contacts to the terminals of the coil of the coil-mass, said connecting means including first and second disc-shaped spring contacts having outer and inner annular portions integrally connected by arcuate spring arms, said inner portions of said spring contacts being in sliding contact with a contact electrically connected to one of the outside terminals and the outer annular portion of each spring contact being electrically connected to one of the leads from the coils, and means for connecting the spring contacts to the coil-mass for movement therewith, said inner and outer portions of the spring contacts being in the same plane when in the unstressed state to keep to a minimum the force exerted by the spring contacts resisting the axial movement of the coil-mass relative to the magnet.

2. In a geophone having an annular coil-mass and a permanent magnet assembly positioned inside the annular coil-mass with its longitudinal axis generally coinciding with the longitudinal axis of the coil-mass, spring means supporting the coil-mass for axial movement relative to the permanent magnet assembly along the longitudinal axis of the permanent magnet assembly to produce an output signal at the terminals of the coil indicative of the movement of the coil-mass relative to the magnet, said spring means including a pair of disc-shaped springs having outer and inner annular portions connected by a plurality of arcuate spring arms, said springs being performed to position the outer annular portion of each spring in a plane spaced above the plane of the inner annular portion a distance such that the weight of the coil-mass will move the outer annular portion downwardly into substantial alignment with the plane of the inner annular portion to thereby resiliently support the coil-mass, a cylindrical housing having closed ends and two electrical contacts extending through the housing for connecting the terminals of the coil into a circuit, the improvement comprising, means for electrically connecting the terminals of the coil to the contacts while allowing the coil-mass to freely rotate around the longitudinal axis of the permanent magnet assembly, said connecting means including a contact ring connected to each contact, two parallel disc springs of electrically conductive material extending transverse the longitudinal axis of the coil-mass, each spring having an inner annular portion in sliding electrical contact with one of the contact rings and an outer annular portion interlocked with the coil-mass to move therewith, the outer annular portion of each spring being electrically connected to one of the terminals of the coil to electrically connect the terminals to the two contacts through the sliding engagement of the inner annular portion and the contact rings, said inner and outer portions of the spring contacts being in the same plane when in the unstressed state to keep to a minimum the force exerted by the spring contacts resisting the axial movement of the coil-mass relative to the magnet.

3. The geophone of claim 2 in which the inner annular portion of each spring conductor has a tab portion bent out of the plane of the spring to resiliently engage one of the contact rings to provide firm sliding contact between the tabs and the rings.

* * * * *